United States Patent
Krisko et al.

(10) Patent No.: US 12,116,833 B2
(45) Date of Patent: Oct. 15, 2024

(54) METHOD OF APPLYING A SEAL MATERIAL IN THE MANUFACTURE OF A VIG UNIT

(71) Applicant: VKR Holding A/S, Hørsholm (DK)

(72) Inventors: Annette Johncock Krisko, Prarie du Sac, WI (US); Peter Sønderkær, Hørsholm (DK); Karsten Hansgaard Nielsen, Hørsholm (DK); Henrik Aslak Jensen, Hørsholm (DK); Timothy Alan Dennis, Hørsholm (DK)

(73) Assignee: VKR HOLDING A/S., Horsholm (DK)

( * ) Notice: Subject to any disclaimer, the term of this patent is extended or adjusted under 35 U.S.C. 154(b) by 816 days.

(21) Appl. No.: 17/287,555

(22) PCT Filed: Nov. 5, 2019

(86) PCT No.: PCT/DK2019/050332
§ 371 (c)(1),
(2) Date: Apr. 22, 2021

(87) PCT Pub. No.: WO2020/094197
PCT Pub. Date: May 14, 2020

(65) Prior Publication Data
US 2021/0381304 A1 Dec. 9, 2021

(30) Foreign Application Priority Data
Nov. 7, 2018 (DK) .............................. PA201870732

(51) Int. Cl.
*E06B 3/66* (2006.01)
*E06B 3/673* (2006.01)
*E06B 3/677* (2006.01)

(52) U.S. Cl.
CPC .......... *E06B 3/6733* (2013.01); *E06B 3/6612* (2013.01); *E06B 3/6775* (2013.01)

(58) Field of Classification Search
CPC .... E06B 3/6733; E06B 3/6612; E06B 3/6775; Y02A 30/249; Y02B 80/22; C03C 27/10
(Continued)

(56) References Cited

U.S. PATENT DOCUMENTS 5,985,069 A 11/1999 Kawabe
2005/0217319 A1 10/2005 Yoshizawa
(Continued)

FOREIGN PATENT DOCUMENTS

AT 14327 U1 9/2014
EP 3225604 A1 10/2017
(Continued)

OTHER PUBLICATIONS

International Search Report for corresponding application PCT/DK2019/050332 filed Nov. 5, 2019' Mail date Jan. 21, 2020.

*Primary Examiner* — James D Sells
(74) *Attorney, Agent, or Firm* — CANTOR COLBURN LLP

(57) ABSTRACT

The present disclosure relates to a method of applying a seal material in manufacturing a vacuum insulated glazing (VIG) unit, wherein the VIG unit comprises a first glass sheet, having a first interior major surface and a first exterior major surface, a second glass sheet having a second interior major surface and second exterior major surface, the glass sheets are placed in parallel with said interior major surfaces facing each other and providing a gap therein between, and a seal material for providing a seal of said gap, wherein the method comprises the steps of providing a glass sheet, and arranging said seal material on a major surface of at least one of said glass sheets by means of a nozzle having a nozzle opening of elongated shape, such as a rectangular or oval shape, providing a plurality of support structures on the major surface of at least one of the glass sheets, pairing said first glass sheet and said second glass sheet so that the surface of
(Continued)

the at least one of said glass sheets comprising the seal material is the interior surface, and evacuating said gap so as to provide said VIG unit. The present disclosure further relates to a method of manufacturing a VIG unit, an application system and a VIG unit.

19 Claims, 4 Drawing Sheets

(58) Field of Classification Search
USPC .......................................................... 156/109
See application file for complete search history.

(56) References Cited

U.S. PATENT DOCUMENTS

| | | |
|---|---|---|
| 2010/0330308 A1 | 12/2010 | Cooper |
| 2014/0154436 A1 | 6/2014 | Cooper |
| 2017/0203997 A1 | 7/2017 | Miyake |
| 2017/0243995 A1 | 8/2017 | Godeke |
| 2021/0254398 A1* | 8/2021 | Andersen .............. E06B 3/6612 |

FOREIGN PATENT DOCUMENTS

| | | |
|---|---|---|
| JP | 2002167244 A | 6/2002 |
| JP | 2002167246 A | 6/2002 |
| WO | 2013180998 A1 | 12/2013 |
| WO | 2016027750 A1 | 2/2016 |
| WO | 2016123273 A1 | 8/2016 |
| WO | 2016144857 A1 | 9/2016 |

* cited by examiner

METHOD OF APPLYING A SEAL MATERIAL IN THE MANUFACTURE OF A VIG UNIT

The invention relates to a method for applying seal material by means of a nozzle having a nozzle opening of elongated shape and a vacuum insulated glazing unit manufactured using the method. The invention further relates to a system for applying seal material according to the method.

BACKGROUND

Vacuum insulated glass (VIG) units provides several advantages such as good insulated properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material, which is applied along the edges of a glass sheet and then subsequently heated in order to melt the glass material to provide an airtight and strong edge sealing.

Patent document no. EP2855816 describes a VIG unit and method for manufacturing a VIG unit, where the side seal material, such as solder glass type material, is arranged on a glass surface so that applied seal material is of a pre-selected dispensed height.

Patent document no. US2005217319 describes a VIG unit, having an interior gap sealed by a low melting point glass frit material, e.g. by means of a dispenser with a dispenser port of 1-2 mm diameter.

Patent document no JP 2002167244 relates to another way of providing a side seal material.

However, applying the edge sealing material may suffer from drawbacks such as e.g. providing VIG units having an uneven edge seal, a relatively large usage of edge sealing material and/or providing lengthy and costly VIG unit manufacturing processes.

The present disclosure may e.g. disclose solutions for larger scale manufacturing which may provide a more smooth/straight edge sealing, a good bonding strength between the edge sealing and VIG glass sheets and/or a solution wherein a reduced amount of sealing material may be used for the edge seal.

BRIEF DESCRIPTION OF THE INVENTION

The first aspect of the present disclosure relates to a method of applying a seal material in manufacturing a vacuum insulated glazing (VIG) unit, wherein the VIG unit comprises
  a first glass sheet, having a first interior major surface and a first exterior major surface,
  a second glass sheet having a second interior major surface and second exterior major surface, the glass sheets are placed in parallel with said interior major surfaces facing each other and providing a gap therein between, wherein a plurality of support structures are distributed in said gap, and
  a seal material for providing a seal of said gap,
  wherein the method comprises the steps of
  providing one of said glass sheets, and
  arranging said seal material on a major surface of at least one of said glass sheets by means of a nozzle having a nozzle opening of elongated shape, such as a rectangular or oval shape
  providing a plurality of support structures on the major surface of at least one of the glass sheets;
  pairing said first glass sheet and said second glass sheet so that the surface of the at least one of said glass sheets comprising the seal material is the interior surface, and evacuating said gap so as to provide said VIG unit.

By the method, the seal material may be arranged on the glass sheet surfaces in an elongated shape substantially similar to the nozzle opening shape, which allows for the seal material to be arranged in a substantially flat shape, with a larger width than height of the seal material.

This may improve contact between the seal material and the glass surface as a large amount of the material is in contact with the glass surface. Furthermore, this contact may be established early on in the VIG production process, facilitating immediate initiation of the bonding process between glass and seal material.

The large width and bonding area of the seal material compared to seal material applied by e.g. a round nozzle can facilitate shorter bonding process, as the larger bonding area can compensate for possible sacrifices in bonding strength. For seal materials, which undergo heat treatment to establish sufficient boding to glass, the shorter bonding process time can reduce risk of thermally damaging other parts of the VIG e.g. the glass sheets, especially if such sheets are tempered glass sheets that may lose tempering strength if heated for a sufficient amount of time at a sufficiently high temperature. A flat, similar to a ribbon-shaped sealing material, may furthermore be more readily heat treatable.

In one or more embodiments, nozzle opening is defined as the outlet opening for dispensing the seal material i.e. the opening at the end of the nozzle, which is directed towards the glass sheet during application of the seal material. The extent of the opening may be defined by a nozzle opening rim. In one or more embodiments, the shape of the nozzle opening may be any long and slender shape such as an elliptical shape, an oval shape, a half-moon shape, an elongated polygon shape such as a rectangular shape, an elongated diamond shape, an elongated trapezoid shape, an elongated triangle shape or an nozzle opening.

In one or more embodiments, the seal material is applied to the glass sheet to provide an edge seal for the VIG unit. The seal material may be applied on a stepped or countersunk edge part of the major surface, e.g. the glass sheet may comprise a first thickness adjacent to the edge of the sheet, where said first thickness is of a different thickness, typically smaller thickness, than the glass sheet thickness in the centre of the sheet. The seal material may be applied on a surface coating, such as a Low-E coating, arranged on or a part of the glass sheet surface.

In one or more embodiments, an assembly provided by the method e.g. a glass sheet with seal material applied thereon, may be a first glass sheet to be arranged with a second glass sheet and support structure(s), to provide a gap there between which is evacuated to produce a VIG unit.

In one or more embodiments, the VIG unit further comprises a plurality of support structures of a shape and structure capable of maintaining the gap within the VIG unit. The support structure may comprise a plurality of separate individual spacers, such as steel spacers.

In one or more embodiments, an interior space defined within the gap of the VIG unit is evacuated to a pressure below atmospheric pressure, such as to a high vacuum level, such as below $10^{-3}$ mbar, or such as below $10^{-4}$ mbar or such as below $10^{-5}$ mbar.

In one or more embodiments, the nozzle opening is configured to provide an application of seal material in an amount equal to between 0.01 g/cm (gram/centimetre) to 0.2 g/cm, such as between 0.02 g/cm to 0.12 g/cm, e.g. between 0.02 to 0.07 g/cm, measured along a ribbon of applied seal material e.g. along an edge of the glass sheet.

In one or more embodiments, the arranged seal material may be of an elongated transverse cross-sectional shape, such as a rectangular or oval transverse cross-sectional shape.

By the elongated nozzle, the seal material can be applied in shape being similar to the final seal shape in the VIG unit. The seal material may undergo further flattening when pairing the glass sheets but undergo less deformation in shape than typical seal material shaped applied via conventional round nozzle openings. This may in turn allow for a larger control of the final seal shape.

In one or more embodiments, the nozzle opening may be of an elongated shape so as to provide an elongated seal material shape on the glass sheet surface. The nozzle opening may be of a shape so as to provide an elongated seal material shape having the longest extent of the applied seal material being similar in extent to the longest extent of the nozzle opening, or such as deviating from the longest extent of the nozzle opening by less than 20%, such as less than 10%, or such as less than 5%.

In one or more embodiments, the nozzle may be designed to be of a width similar to a pre-determined minimum seal width required for a specific VIG unit application. Applying the seal material in a shape similar to the final seal shape, allows for an easier determination and application of the amount of seal material needed, whereby less seal material is wasted, which in turn minimize seal material requirements and decrease production cost.

In one or more embodiments, the width (w1) of the seal material is measured along the longest extent of the applied seal material, e.g. along the glass sheet surface on which the seal material is arranged and the height (h2) is measured perpendicular to the glass sheet surface. The transverse cross-section of the seal material is defined by axes extending parallel to the width and height of the seal material.

In one or more embodiments, the applied seal material height (h1) is measured substantially immediately after application on the glass surface and prior to any further treatment, such as heat treatment or drying. In one or more embodiments, the average applied seal material height (h1) is between 0.5-3.0 times larger (or smaller), such as 1-2 times larger than the average nozzle opening height (h2). In one or more embodiments, the average applied seal material width (w1) is between 0.7-1.3 times larger (or smaller), such as 1.0-1.1 times larger than the average nozzle opening width (w2).

In one or more embodiments, due to the elongated seal material shape, the variation in seal material height (h1) is less than 30%, or such as by less than 25%, or such as by less than 20% along a ¾ part of the seal material width, where the ¾ part of the width is centred around the centre point half way across the total width of the seal material measured transverse to the seal material in a direction perpendicular to the edge of the glass sheet.

An elongated seal material shape can provide a substantially planar upper seal material surface, which may be beneficial for pairing purposes of glass sheets and strain/stress control in the final vacuum insulated glazing (VIG) unit.

In one or more embodiments, the nozzle is positioned directly above and opposite to the major surface of said glass sheet to which the seal material is applied and wherein this major surface subsequently is placed to face the second glass sheet during paring.

In one or more embodiments, the major axis of the nozzle opening may be substantially parallel to a major surface of the glass sheet surface.

The major axis of the nozzle opening is defined along the widest extend of the opening, while the minor axis is defined along the shortest extend of the opening. By arranging the nozzle relative to the glass surface such that the major axis is substantially parallel to the major surface of the glass surface, the seal material may be applied onto the surface in an elongated shape with the largest extent of dispensed seal material being substantially parallel to the glass surface.

In one or more embodiments, by "applied onto the surface" is meant that the seal material is applied to the major surface of the glass sheet to face the evacuated gap directly from above and in an elongated shape with the largest extent of dispensed seal material being substantially parallel to the glass surface.

Hence, in one or more embodiment, the seal material is applied to the major surface of said glass sheet directly from above.

In one or more embodiments, the seal material is applied to the major surface of said one glass sheet directly from above at an angle between 10 degrees to 90 degrees.

The nozzle may be arranged at an angle between 10 degrees to 90, such as between 20 degrees to 75 degrees to the major surface of the glass sheet while the material is applied. This angle may be measured/estimated between the major surface and an axis, such as a centre axis of the nozzle extending in the longitudinal direction and/or seal material applying direction of the nozzle.

In one or more embodiments, the seal material is arranged on the major surface of said glass sheet by means of a nozzle before pairing said first glass sheet and said second glass sheet.

After the side seal material is provided to one or both major surfaces of the glass sheets, the glass sheets are paired and the major surface or surfaces comprising the applied side seal material are configured to face the gap to be evacuated.

In one or more embodiments, the height (h2) of the nozzle opening, measured along the minor axis of the nozzle opening, may be between 0.1-1.5 mm, or such as between 0.1-0.6 mm or such as between 0.2-0.4 mm.

The nozzle opening may be made by laser cutting or by mechanical cutting. The dimensions of the opening of the nozzle must be carefully chosen based on the desired seal material dimensions as well as the rheology and viscosity of the seal material. A too large nozzle opening height can result in dispensing too much seal material, while a too small nozzle opening height can result in the nozzle opening being readily blocked. In one or more embodiments, the nozzle opening may be of a height (h2) between 0.1-0.8 mm or between 0.1-0.4 mm or between 0.2-0.3 mm. In one or more embodiments the nozzle opening is of a height (h2) of 0.18 mm or 0.25 mm.

In one or more embodiments, the nozzle opening may be of a height (h2) between 0.10-0.40 mm, or such as between 0.15-0.30 mm and wherein the nozzle opening may be of an aspect ratio between (16:1)-(48:1) or such as between (24:1)-(40:1).

By the present aspects ratios of the nozzle opening, the right relation between the height of seal material and width of seal material can be applied, for hermetic sealing of the gap between glass sheets of a VIG unit. The aspect ratio is determined as the ratio of nozzle opening width (w2) to nozzle opening height (h2), where the width (w2) is measured along the major axis of the opening and the height (h2) is measured along the minor axis of the opening. As an example, with a height (h2) of 0.25 mm, the width (w2) may be between 4-12 mm or such as between 6-10 mm.

In one or more embodiments, the applied seal material height (h1) may be between 0.3-0.6 mm, or such as between 0.3-0.5 mm, or such as between 0.4-0.6 mm, measured perpendicular to a major surface of the glass sheet on which the seal material is applied.

The seal material height provides enough seal material for the sealing process, in order to seal the gap between the glass sheets. In one or more embodiments, the gap between glass sheets may be set to 0.15-0.25 mm, but with variation in the planarity of the glass sheets, the gap size may vary with +/−0.1 mm when paired, especially if the glass sheets are thermally tempered glass sheets. By the present method, using an elongated nozzle opening for applying seal material, the seal material may be deposited to a height close to the gap height, as it is simultaneously deposited to a width (w1) close to the desired seal width. No extra material corresponding to a large height of the seal material may be needed to provide the desired width after pairing the sheets. In one or more embodiments, the applied seal material height (h1) is below 0.4 mm. In one or more embodiments, the applied seal material height (h1) is approximately 2.0-2.5 times the average distance between the interior surfaces of the glass sheets, i.e. the gap size.

In one or more embodiments, the seal material is a low melting point glass material applied in past-form to a height (h1) below 0.4 mm, or between 0.4-0.5 mm and comprising solvent and binder. The present heights (h1) allows suitable curing of the material during the sealing process.

In one or more embodiments, the transverse cross-sectional shape of the applied seal material may be of a height between 0.4-0.6 mm and wherein the transverse cross-sectional shape may be of an aspect ratio, being the ratio of width (w1) to height (h1), is between (5:1)-(30:1), or such as between (8:1)-(24:1) or such as between (10:1)-(20:1).

By the present aspects ratios of the seal material, the most suitable relation between the height of seal material and width of seal material can be provided, for hermetic sealing of the gap between glass sheets of a VIG unit. The aspect ratio is determined as the ratio of seal material width (w1) to seal material height (h1), where the width (w1) is measured along the minor axis of the seal material in a plane parallel to a major surface of the glass sheet on which the seal material is deposited and the height (h1) is measured perpendicular to the major surface of the glass sheet. As an example, with a height (h12) of 0.5 mm, the width (w1) may be between 2.5-15 mm, such as between 4-12 mm or such as between 5-10 mm.

In one or more embodiments, the width (w2) of the nozzle opening may be between 3-15 mm, or such as between 6-14 mm, or such as between 6-12 mm, measured along the major axis of the nozzle opening.

The dimensions of the opening of the nozzle must be carefully chosen based on the desired seal material dimensions as well as the rheology and viscosity of the seal material. The width of the seal material, creating the barrier between the interior of the gap and the outside of the VIG unit, can be controlled by controlling the width (w2) of the elongated nozzle opening without unnecessary overuse of seal material.

In one or more embodiments, the applied seal material width (w1) may be between 3-12 mm, such as between 5-12 mm, such as between 5-9 mm or such as between 4-8 mm measured along a major surface of the glass sheet on which the seal material is deposited.

The seal material may preferably be chosen to be similar in size to the desired final seal width within the VIG unit.

The sealing efficiency of seal material to be applied to near the edges of the glass sheets to seal the gap is critical to the lifetime of the VIG unit. The seal material has to provide a hermetic seal, maintaining a low pressure within in the gap of $10^1$ mbar or below and avoid mechanical breakage and accommodate glass sheet movement, which may e.g. occur due to impact or due to temperature differences between the glass sheets and generally different thermal expansion of the glass sheets.

Among other requirements, the seal material needs to provide gas diffusion resistance. The level of diffusion through the seal may be highly dependent on the seal width. By the present method, the final seal width may be precisely controlled by controlling the applied width of the elongated seal material without having to use a large amount of seal material. The risk of gas diffusions can thereby be precisely controlled already at the application stage of the VIG unit manufacturing process.

In one or more embodiments, the method may comprise the step of providing a relative displacement between the nozzle opening and the glass sheet surface during application of the seal material.

By providing said relative displacement the seal material may be applied along an area of the glass sheet surface preferably along an edge of the glass sheet surface e.g. along an elongated bonding area, so as to provide a side seal material for the VIG unit. The speed of the relative displacement may be adjusted so that a continuous ribbon of seal material may be applied on the bonding area. Furthermore it may be set to a speed at which a uniform height of side seal material is applied or at a speed at which a non-uniform height of seal material is applied, e.g. for non-uniform glass surfaces.

The height and volume of the seal material applied may be adjusted through adjustment of the speed of displacement. In one or more embodiments, the speed of the seal material after existing the nozzle opening is substantially equal to the speed of the displacement.

In one or more embodiments, at corners of the glass sheet surface, where the direction of application along the surface changes, a different and reduced speed is used during application compared to the speed of displacement used for the linear application along the sides of the glass sheet. The direction of displacement was changed across a 90 degrees angle so that the seal material is applied along a curvature of a radius of about 5 mm.

The relative displacement may be undertaken by means of a transport system. The transport system may provide a movement of the nozzle while the glass sheet surface is in a fixed position and/or the transport system may provide a movement of the glass sheet surface while the nozzle is in a fixed position. The transport system may comprise a conveyor belt supporting said glass sheet or it may comprise one or more rails extending above said glass sheet on which rail(s) the nozzle is in connection to such that it may be displaced along said rail(s).

In one or more embodiments, the seal material may be forced through said nozzle opening by means of a pressure system configured to apply a dispensing pressure on said seal material.

By applying a suitable pressure on the seal material so as to force it through the nozzle opening, a large dimensional control of the applied seal material shape can be facilitated. The height and volume of the seal material applied may be adjusted through adjustment of the pressure applied to the seal material. In one or more embodiments, the pressure is at a pressure value, which provides an applied seal material dimension, which is similar to the dimensions of nozzle opening.

In one or more embodiments, said dispensing pressure may be between 5-20 Psi, such as between 10-15 Psi.

In one or more embodiments, the nozzle opening may be arranged at a dispenser distance (d1) between 0.4-3 mm or such as between 0.5-1.5 mm from said major surface when arranging said seal material on said major surface.

In one or more embodiments, the dispenser distance (d1) is below 2 mm, such as below 1 mm or such as about 1 mm.

The inventor has found indications of a relationship between the distance (d1) and the applied seal material dimensions. The dispenser distance (d1) is measured as the shortest distance between the nozzle opening and the glass sheet surface. If the nozzle opening is at a relatively large distance from the glass surface, the shape of the seal material may undergo significant and uncontrolled change along the distance from the nozzle opening to the glass surface. Therefore, by the distances (d1) a significant amount of control of the seal material dimensions are maintained.

In one or more embodiments, the dispenser distance (d1) is kept constant, and neither the glass sheet nor the nozzle is displaced in a vertical direction perpendicular to the glass surface, during application of seal material, so that the dimensions of the applied seal material may be consistent along the applied ribbon of seal material.

The actual dispenser distance (d1) between the glass sheet surface and the nozzle opening may vary for reason such as in cases where the nozzle opening is not displaced along a horizontal direction parallel to the major surface of the glass sheet, due to miss-alignment or in cases where the glass sheet surface is not completely planar, such as when it comprises surface waves or edge kinks, usually seen in thermally tempered glass sheets.

In one or more embodiments, the method may comprise the steps of
- obtaining by means of a sensor system (10) surface variation data of the glass sheet surface (3a) to be applied with said seal material (2), and
- adjusting a dispenser distance (d1) defined between said nozzle opening (6) and said glass sheet surface (3a) based on said surface variation data by controlling an adjustment system (9).

The adjustment of the dispenser distance (d1) may be provided so that the seal material is dispensed across a dispenser distance (d1) selected to correspond to one or more values within a group of dispenser distance (d1) values, e.g. such as at a dispenser distance (d1) between 0.4 and 0.5 mm. In one or more embodiments, a substantially constant dispenser distance (d1) is provided during seal material application. This may be provided even on thermally tempered glass sheet surfaces, as the present method may be capable of compensating for surface variations based on surface variation data relating to one or more glass sheets to be paired, by adapting/adjusting the dispenser distance (d1) based on the surface variation data. Surface variations may additionally vary from glass sheet to glass sheet, and may vary dependent on along which end of the glass sheet surface the seal material is applied.

In one or more embodiments, the dispenser distance (d1) may be controlled based on measured surface topography of the glass sheets, such that the vertical position of the nozzle opening is altered if the measured surface height of the glass surface changes along an application area of the glass surface. The dispenser distance (d1) may be controlled/adjusted during application of the seal material, such as continuously controlled/adjusted while seal material is being applied. Additionally, the dispenser distance (d1) may be controlled/adjusted while a relative displacement is provided between the glass sheet surface and said nozzle opening.

By adapting/controlling the dispenser distance (d1) based on surface variation data several advantages may be obtained. For example, individually adapted side seals having dimensions and/or other characteristics that may be desired may be obtained. For example, adjusting the dispenser distance (d1) may spare the needed amount of edge seal to provide a sufficient edge sealing bonding. Also or alternatively, it may help to provide a solution wherein a more thin and/or straight edge seal may be obtained at the final VIG unit after two glass sheet have been paired so that the side seals hermetically seals a gap between the glass sheets.

In one or more embodiments, the said adjustment system is controlled by a control system based on surface variation data obtained by said sensor system e.g. during a relative displacement between a sensor of the sensor system and a glass sheet to be applied with the seal material by means of said nozzle. The control system may be configured to receive a measurement input from one or more sensors of the sensor system relating to measured surface variations of the glass sheet surface. The control system may process said input of surface variation data by means of a data processor based on a regulation program code stored in a data storage and provide a control signal accordingly to said adjustment system. The adjustment system may be configured to control the dispenser distance (d1) based on a control signal from the control system.

In one or more aspects of the present disclosure, the sensor system may be configured to measure/provide input relating to surface variations at the part of the surface where the seal material will subsequently be applied by the nozzle, or near, such as within 10 cm, e.g. within 5 cm, e.g. within 1 cm from the surface where the seal material for the edge sealing will subsequently be applied by the nozzle.

In one or more embodiments, the majority or all of the seal material may be of a glassy seal material, such as a low melting point glass material, such as lead-free low melting point glass material, or softened glass, a metal solder material, a metal oxide solder material. In one or more embodiments, possible suitable side seals for the VIG unit may include materials such as low melting point solder glass frit, indium, Ostalloy 313-4, 99% indium (In) wire e.g. available from Arconium (Providence, R.I.), liquid glass (e.g., glass composition with water in it when applied, wherein the water evaporates when heated to form the seal) or it may a seal material as disclosed in e.g. one or more of the embodiments of e.g. paragraphs [0020] to (and including)[0089] of US 2017/0243995 A1, or a solder glass material as disclosed in one or more of the embodiments of e.g. paragraphs [0071] to (and including)[0074] of US 2017/0203997 A1 and/or a solder glass material as disclosed in one or more of the embodiments of e.g. paragraphs [0013] to (and including) [0046] of WO 2016/123273 A1.

In one or more embodiments, the seal material, when applied, may be of a viscosity which is dispensable through the nozzle openings according to the present disclosure. The seal material may be in paste or liquid form and providing the side seal during or after the VIG manufacturing process.

In one or more embodiments, the seal material may be a low melting point glass frit material.

The thermal expansion coefficient of the glass sheets and the seal material may be of a similar thermal expansion coefficient so as to provide a more durable seal. One of the advantages of using the low melting point glass frit, it that it can be provided as having a thermal expansion coefficient similar to the bonded parts, making it a highly attractive sealing material. E.g. the low melting point glass material may be a combination of two different materials comprising glass solder frit with different thermal expansion coefficients that are adjusted to correspond to the thermal expansion coefficients of the bonded parts.

In one or more embodiments, the low melting point glass material, e.g. $SiO_2$ comprise glass material, such as glass powder, in content between 30-95 wt %, such as 35-75 wt % or such as 45-65 wt % and further the low melting point glass material comprises binder material, inorganic filler materials and solvent material. In one or more embodiments, the low melting point glass material may comprise a glass material (e.g. about 20-40 wt %) and a portion of the following compounds (e.g. about 60-80 wt %): at least one binder material (e.g. propylene carbonate $(C4H6O3)n$), inorganic fillers, and at least one solvent (e.g. propane-1,2-diyl diacetate). The seal material may be a vanadium-tellurium oxide solder glass material. In one or more embodiments, the low melting point glass material comprises glass material, solvent material and binder materials, such as about 80-90 wt % glass powder, 1-5 wt % binder material and 9-15 wt % solvent material.

In one or more embodiments, the low melting point solder glass material comprising the following ingredients: tellurium dioxide, divanadium pentaoxide, aluminium oxide in glasses/pigments and manganese dioxide. The concentrations of the ingredient may be 30-50% tellurium dioxide, 20-30% divanadium pentaoxide, 5-10% aluminium oxide in glasses/pigments and 1-5% manganese dioxide.

The solvent and binder material may allow for an easier application of the glassy seal material in which it may be applied as a paste adhering to the surfaces to be bonded. The solvents may be added in amount needed to obtain the desired viscosity of the paste. Solvents used may evaporate from the seal material during the VIG unit manufacturing process e.g. around 100 degrees C. Low melting frit material used as seal material in a VIG unit, typically undergo a heat treatment process for bonding the seal material to the interior surfaces of the glass sheets.

In one or more embodiments, the glass sheets 3 can be annealed, for example annealed at a temperature of at least 375° C.

In one or more embodiments, one or more of the glass sheets may be a tempered glass sheet.

Tempered glass, also known as toughened glass, may be produced from annealed glass by means of a strengthening procedure, which e.g. may be thermal tempering, chemical tempering, or plasma tempering with the purpose of introducing the compressive stresses into the surface(s) of the glass sheet. After tempering, the stress developed by the glass can be high, and the mechanical strength of tempered glass can be four to five times greater than that of annealed glass. Thermally tempered glass may be produced by means of a furnace in which an annealed glass sheet is heated to a temperature of approximately 600-700° C., after which the glass sheet is rapidly cooled. The cooling introduces the compressive stresses into the glass sheet surface(s).

A second aspect of the present disclosure relates to the use of a nozzle for applying a seal material on a glass sheet for a vacuum insulated glazing unit prior to pairing the glass sheet with a second glass sheet, wherein the nozzle comprises a nozzle opening of elongated shape, such as a rectangular or oval shape.

In one or more embodiments of the second aspect, the nozzle may comprise any of the features and benefits as described in relation to one of more aspects of the present disclosure.

Also disclosed is a method of manufacturing a vacuum insulated glazing (VIG) unit, wherein the method comprises applying a seal material in manufacturing a vacuum insulated glazing (VIG) unit according to the method of aspect one of the present invention.

A third aspect of the present disclosure relates to a method of manufacturing a vacuum insulated glazing (VIG) unit, wherein the VIG unit comprises
 a first glass sheet, having a first interior major surface and a first exterior major surface,
 a second glass sheet having a second interior major surface and second exterior major surface, the glass sheets are placed in parallel with said interior major surfaces facing each other and providing a gap therein between, and
 a seal material for providing a seal of said gap,
 wherein the method comprises the step of
 applying said seal material by a method according to any of the embodiments of the first aspect of the present disclosure,
 providing one or more support structures on the major surface of at least one of the glass sheets
 pairing said first glass sheet and said second glass sheet
 evacuating said gap so as to provide said VIG unit.

The present method for manufacturing VIG unit, increases the control of the final dimensions of the VIG unit side seal and provides a side seal uniform in position and dimension for an improved VIG unit. The present method further provides minimization of the amount of seal material necessary to obtain the VIG unit.

In one or more embodiments, by one or more support structures is meant a plurality of support structures.

In one or more embodiments, the seal material and glass sheets may be according to any of the previous embodiments of the first aspect of the present disclosure. In one or more embodiments, the seal material may be applied on both the first glass sheet and the second glass sheets, such that prior to pairing, both sheets have seal material arranged on a part of a major surface thereof. This can increase the probability of having similar bonding strength of the seal material to both glass sheets.

In one or more embodiments of any one of the aspects of the present invention, the one or more support structure may be provided on a major surface e.g. before or after applying said seal material on said major surface. The support structure(s) may be any suitable support structure(s), such as disclosed in relation to any of the aspects in the present disclosure.

In one or more embodiments of the first or the third aspect, the method step of evacuating said gap may be provided through one or more evacuation openings for evacuating said gap, and the method may further comprise a step of sealing said evacuation opening(s) after evacuation.

In one or more embodiments of the first or the third aspect, the method comprises the step of evacuating an interior space defined within the gap of the VIG unit, though one or more evacuation openings and thereafter sealing said evacuation opening. In one or more embodiments, the evacuation opening may be temporarily provided between the seal material and the glass sheet(s) and eliminated upon sealing the gap by the seal material.

The evacuation opening may be arranged anywhere in the VIG unit, such as between the glass sheets, e.g. in the side seal material or through one of the glass sheets. In one or more embodiments, the VIG unit is evacuated through an evacuation opening e.g. through one of the glass sheets, extending from the exterior major surface to the interior major surface for providing an evacuation pathway for fluid connection in order to extract gas from within the interior space. In one or more embodiments, the evacuation of the space in the gap may be facilitated by an evacuation cup covering an evacuation opening in one of the glass sheets and providing fluid connection between a pump and said interior space. In one or more embodiments, the fluid connection may be through an evacuation tube arranged in said evacuation opening and sealed to said evacuation opening in order to provide the evacuation of the space.

In one or more embodiments, the entire VIG unit assembly may be placed in a vacuum chamber, where the interior space is evacuated through one or more evacuation openings present in the side seal material. The one or more evacuation opening(s) may be configured to provide a fluid connection between the interior space within the gap and a pump for evacuation said vacuum chamber.

In one or more embodiments of the first or the third aspect, the method may further comprise the step of heat treating said seal material so as to facilitate providing a hermetic seal.

In one or more embodiments, the heat treating step may be provided by at least a furnace. The VIG unit may be arranged inside a chamber of a furnace, during at least heat treating said seal material.

In one or more embodiments, the heat treatment may involve heating said seal material according to a pre-determined temperature profile. The temperature profile may include both heating and cooling periods, where the temperature of the side material is increased or decreased respectively. By heating the side seal material as well as the glass sheets, impurities can be extracted from the glass sheets and unwanted components of the side seal material can be removed, e.g. so that these impurities and unwanted components do not later negatively interfere with the low pressure within the interior space during the lifetime of the VIG unit.

In one or more embodiments, the temperature of the seal material may be altered by a heating arrangement, such as a heating arrangement comprise a single or several heating elements, and the heating elements may be chosen from a group of different types such as IR radiation, microwave or laser radiation, induction, electrical and ceramic heaters. The heating means may be configured to provide local heating, e.g. heating of one or more parts of the VIG unit e.g. the seal material only, or global heating of the entire VIG unit. In one or more embodiments, the seal material is heated by means of a furnace. The entire VIG unit maybe heated by said furnace.

As the seal material of the present disclosure has an essentially more elongated and flat shape than round shape on the glass sheet surface, the drying and/or heat treatment of the material can be more readily executed e.g. due to the large surface area. The material can be more readily heated and components can be more readily evaporated, thereby saving time and cost of manufacturing.

In one or more embodiments, the seal material is a low melting point glass frit material. The material arranged on the first glass sheet may be heated to a temperature of at least 250 degrees C., such as at least 270 degrees Celsius to allow sintering of the material. The sintering of the seal material may be undertaken after pairing of the first and second glass sheets.

Prior to pairing of the glass sheets the seal material arranged on one of the glass sheets may be dried e.g. to evaporate solvents included in the material. Typically, the drying time of a low melting point glass material is dependent on binder type and solvent type of the material. As a result of the elongated shape of the seal material a shortening of the drying time may be facilitated, e.g. such as at least a 20% reduction in drying time, without changing the binder and solvent time.

In one or more embodiments, the low melting point glass material may be heated to a first temperature ($T1$) is between 320-425 degrees Celsius, such as between 330-400 degrees Celsius, such as between 340-380 degrees Celsius or such as between 340-360 degrees Celsius, in order to bond the seal material to the surfaces to be bonded, e.g. the interior major surface of the glass sheets.

In one or more embodiments, the first temperature ($T1$) is below 450 degrees, such as below 425 degrees Celsius. This upper limit on the first temperature is in particular beneficial for the maintaining the integrity of tempered glass sheets.

In one or more embodiments, the first temperature ($T1$) may be maintained between least 5 min-80 min, such between 15 min-75 min, such as between 25 min-65 min or such as at least 35 min. E.g. a low melting point frit material may be maintained for a time between 50-70 min at a first temperature ($T1$) between 360-390 degrees Celsius.

In one or more embodiments, the method comprises the step of changing the temperature of said VIG unit to a curing temperature (Tcure) between 250-380 degrees Celsius, such as between 260-360 degrees Celsius, or such as between 275-300 degrees Celsius.

In one or more embodiments, an evacuation at the present curing temperature (Tcure) may provide a thermal cleaning by evacuating gas such as air and contaminants from the interior space. Additionally it may force the glass sheets towards each other. During the evacuation process, it is advantageous to operate at relatively high temperatures as impurities and contaminants from the low melting point glass frit materials, low emissivity coating and the glass sheets thereby become increasingly released and evacuated from the interior of the VIG unit.

In one or more embodiment, where a low melting point glass frit material is used, the present curing temperatures provides a viscosity of the side frit material, which is in a deformable state, which permit the glass sheets to move towards each other without creating any undesirable internal stresses along the glass sheets during the evacuation of the interior space. Furthermore, it provides a viscosity, which is sufficiently high to withstand the applied vacuum pressure and being sucked into the interior space.

In one or more embodiments, the evacuation of the interior space is initiated while the temperature of the seal material is lowered towards or at a curing temperature (Tcure). The interior space in the gap, enclosed by the seal material may be evacuated to a pressure below $10^{-3}$ mbar, such as below $10^{-4}$ mbar or below $10^{-5}$ mbar. The high level vacuum level at very low pressure levels relative to atmospheric pressure are desirable as they may provide a reduction in heat losses, such as conductive heat losses, across the VIG unit, i.e. through the interior space.

A fourth aspect of the invention relates to an application system for applying a seal material on a glass sheet surface, wherein the system comprises a container configured for holding said seal material,
a nozzle comprising a nozzle opening for dispensing said seal material,
a pressure system configured for applying a dispensing pressure so as to force said seal material through said nozzle opening of the nozzle,
a transport system configured to provide a relative displacement between the nozzle opening and the glass sheet surface, wherein the nozzle opening is of a substantially elongated shape, and
wherein the system is configured for executing a method according to any of the first or third aspect of the present disclosure.

Also disclosed is an application system for applying a seal material on a glass sheet surface, wherein the system comprises
a container configured for holding said seal material,
a nozzle comprising a nozzle opening for dispensing said seal material,
a pressure system configured for applying a dispensing pressure so as to force said seal material through said nozzle opening of the nozzle,
a transport system configured to provide a relative displacement between the nozzle opening and the glass sheet surface, wherein the nozzle opening is of a substantially elongated shape, and
wherein the system is configured for applying the seal material to the glass sheet surface directly from above.

In one or more embodiments, the container may be configured to be able to at least temporarily hold the seal material prior to being applied onto the glass surface through the nozzle. The container is provided with and outlet in connection with said nozzle and nozzle opening, so that the seal material may be displaced from said container out through said nozzle. The displacement of the seal material may be assisted by pressure system arranged at said container for forcing the seal material from said container to said glass sheet surface on which the seal material is to be applied. The pressure system may comprise a volumetric dosing pump. The pressure system configured to apply a dispensing pressure on said seal material so as to force said seal material through said nozzle opening wherein said dispensing pressure is between 5-20 Psi, such as between 10-15 Psi. In one or more embodiments of the present disclosure, the pressure system is configured to vary the amount of applied seal material in the range of 0.01 g/cm (gram/centimetre) to 0.2 g/cm, such as between 0.02 g/cm to 0.12 g/cm, e.g. between 0.02 to 0.07 g/cm. This may be varied by controlling the rotation speed of a conveyer screw by an input signal, by varying a pressure applied by means of a pressurized gas and/or the like.

The application system may comprise two or more nozzles, each having an elongated nozzle opening. The nozzle openings may be similar or different, e.g. depending on which end(s) of the glass sheets they are used for applying seal material. Each nozzle may additionally be in connection with one or more seal material containers and one or more pressure systems.

The transport system may provide a movement of the nozzle and container with pressure system while the glass sheet surface is in a fixed position and/or the transport system may provide a movement of the glass sheet surface while the nozzle and container with pressure system is not moving. The transport system may comprise a conveyor belt supporting said glass sheet or it may comprise one or more rails extending above said glass sheet on which rail(s) the remainder of the system is arranged such that it may be displaced along said rail(s).

The application system may comprise a nozzle according to any of the previous embodiments of the present disclosure. In one or more embodiments of the system, the major axis of the nozzle opening is substantially parallel to the glass sheet surface. The nozzle opening may be of an aspect ratio between (16:1)-(48:1), such as between (24:1)-(40:1), wherein the aspect ratio is determined as the ratio of width (w2) to height (h2), where the width (w2) is measured along the major axis of the opening and the height (h2) is measured along the minor axis of the opening. The height (h2) of the nozzle opening, measured along the minor axis of the nozzle opening, may be between 0.1-1.5 mm, such as between 0.1-0.8 mm, such as between 0.1-0.6 mm, such as between 0.2-0.4 mm or such as between 0.2-0.3 mm. The width (w2) of the nozzle opening maybe between 3-15 mm, such as between 5-11 mm, such as between 6-14 mm, such as between 6-12 mm, such as between 6-10 mm, or such as between 7-9 mm, measured along the major axis of the nozzle opening.

In one or more embodiments, the application system may further comprise a control system, a sensor system and an adjustment system according to any of the previous embodiments or aspects of the disclosure. In one or more embodiments, the application system may be comprised in a manufacturing facility for providing a VIG unit according to the present disclosure. The application system may enable the application of a side seal material on glass sheet surface for a VIG unit in the production of the VIG unit. The manufacturing facility may be arranged to execute a method according to any aspects of the present disclosure.

Also disclosed herein is the use of an application system according to the present disclosure for applying a seal material on a glass sheet surface directly from above.

A fifth aspect of the present disclosure relates to a vacuum insulated glazing (VIG) unit comprising
a first glass sheet, having a first interior major surface and a first exterior major surface,
a second glass sheet having a second interior major surface and second exterior major surface, the glass sheets are placed in parallel with said interior major surfaces facing each other and providing a gap therein between,
a plurality of support structures for maintained said gap, and
a seal for sealing said gap provided by a seal material,
wherein the seal material has been applied by means of an elongated nozzle opening and
wherein the seal comprises a seal portion defined along a length of at least 10 cm of the seal, measured along the neighbouring edge of the glass sheet, and
wherein the variation in seal width (w1_seal) is less than 20%, such as less than 15% or such as less than 10% along said seal portion.

A seal material providing a side seal in a VIG unit having a low seal width variation as a result of using elongated nozzle application, is of a seal strength and efficiency which may be increasingly uniform along the seal length, and provide a uniform distribution of forces, which may be applied on the VIG unit. Essentially, the risk of producing weak points within the final seal may be significantly reduced, which in turn provides a more sturdy and durable VIG unit. The side seal preferably extends along and near the edge of the VIG unit and between said interior surfaces of the glass sheets of the VIG unit. The side seal may be provided by the seal material by heating said material providing a bond between the glass sheets and the seal material.

By means of the elongated nozzle, the width of the seal material can be more precisely controlled compared to application of seal material using a round nozzle, as the seal material can be deposited in a shape close to the final seal shape of the VIG unit. The variation may be calculated based on difference between the largest final seal width and the smallest final seal width measured along the length of the seal portion, e.g. along a 10 cm seal portion the smallest seal width may be measured as 4 mm and the largest seal width may be measured as 5 mm, providing a maximum of 20% variation in seal width along the specified seal portion. The elongated nozzle according to the present invention, may be capable of producing seal material width variations of less than 8%, or less than 7%, even down to less than 5%.

In one or more embodiments, the variation in seal width may be less than 40%, such as 30% or such as 20% or such as 10% along a seal portion of a length of at least 10 cm, or such as at least 15 cm, of a length equal to one side of the VIG unit or of a length equal to the length of the entire seal, e.g. around the entire interior space within the gap. The seal portion may be defined along the entire length of the seal or the seal portion may be defined along a 5-25 cm long portion of the seal, or such as along a 10-20 cm long portion of the seal. A section or all of the longitudinal extent of the seal may define the seal portion. In one or more embodiments, the variation in the seal width may be below 2.4 mm, such as below 1.8 mm, such as below 1.4 mm, such as below 1.0 mm, such as below 0.8 mm. In one or more embodiments, the variation in the seal width may be between 0.5-2.4 mm, such as between 0.5-1.8 mm, such as between 1-2 mm. In one or more embodiments, the seal width is no less than 4 mm, or no less than 5 mm.

In one or more embodiments, the seal material width may be between 4-12 mm, such as between 4-8 mm, such as between 5-12 mm, such as between 6-10 mm, measured parallel to the major surface of the glass sheet on which the seal material is applied, along a direction substantially perpendicular to the edge of the sheet. The width of the seal material may be chosen based on several design considerations, such as appearance, seal efficiency, amount of seal material needed etc. A width of at least 6 mm, generally provides a durable seal width facilitating a hermetic and long-lived seal due to properties such as a sufficiently large bonding area to the glass surface.

The elongated nozzle can in turn provide an elongated seal material deposition, simultaneously facilitating a large bonding area due to large width, a substantially planer upper seal material surface for more efficient pairing with opposing glass sheet and furthermore the large dimensional control of the seal material makes it possible to precisely control the amount of the seal material applied so that it matches the minimum amount needed for the present purpose, thereby saving sealing material and overall production cost.

In one or more embodiments, the side seal extends from a portion of said edge region of the first glass sheet to said second major interior surface of said second glass sheet. The side seal may only be bonded to a part of the edge region, such as a part of the edge region near the edge of the glass sheet arranged with said edge region. The edge region may be exposed on either side of the side seal.

One or more support structures may be arranged between the interior major surface of the first glass sheet and the interior major surface of the second glass sheet. The support structure may be arranged in the interior space for maintaining the gap distance between the glass sheets in the VIG unit, also in the case the gap distance between the glass sheets experience small variations due to e.g. a physical impact or thermal influences. The support structures may be arranged on one of the glass sheets of the VIG unit prior to pairing said glass sheets. The support structures may be in contact with the first and the second interior surfaces of the glass sheets. In one or more embodiments, the interior major surfaces may come into contact with support structures during or after evacuation of the interior space, possibly assisted by forcing the sheets together by external means such as clamps applying a force on the exterior surfaces of the glass sheets.

In one or more embodiments, the support structure may comprise a height of 0.05 to 0.7 mm, such as 0.1 to 0.4 mm, or such as 0.15 to 0.3 mm. In one or more embodiments, the support structure comprises a plurality of spacers distributed within the interior space. The spacers may have the same or different heights depending on gap size. In another embodiment, each spacer independently has a height of 0.05 to 0.7 mm, such as 0.1 to 0.4 mm, or such as 0.15 to 0.3 mm. The spacers can have width of 0.1 to 1 mm, such as 0.2 to 0.8 mm, or such as 0.3 to 0.7 mm.

In one or more embodiments of one or more aspects of the present disclosure, the support structure may be of any suitable material, for example solder glass, a polymer (e.g., Teflon), plastic, ceramic, glass, metal, or the like. The spacer may comprise a steel or a solder glass. Examples of spacers are shown in e.g. WO 2016/027750 and WO 2016/144857, and the spacers may be provided as a glass frit paste that is printed onto the inner surface of at least one of the two glass sheets and subsequently heated to form the spacers as shown in e.g. AT 14327 U. A spacer may comprise a metal, a ceramic, or a glass, a steel or a solder glass. Each adjacent spacer may be arranged with a distance of 20 to 120 such as 25 to 80, or such as 30 to 60 mm between them.

In one or more embodiments of one or more aspects of the present disclosure, one or more of the glass sheets of the VIG unit may be tempered glass sheets such as thermally tempered glass sheets or chemically tempered glass sheets. Tempered glass sheets are of high thermal and mechanical strength due to internal compressive and tensional stresses. As a result of using tempered glass, a lower amount of support structures may be needed between the sheets in order to withstand the atmospheric pressure on the sheets and minimize bending of the sheets towards the interior space. With tempered glass, supports structures consisting of spacers may be separated with a distance above 35 mm, such as 40 mm or such as 50 mm, thereby minimizing the visible distraction that may be experienced due to the spacers when looking through the glass and minimizing the heat transfer between the glass sheets.

In one or more embodiments of the present disclosure, in the vacuum insulated glazing (VIG) units one or both of the glass sheets of the VIG unit may be coated with a low emissivity coating, usually on the inner surface of the glass sheet facing the gap. Such low emissivity coating has the ability to modulate the insulation properties of the VIG unit by transmitting and reflecting selected wavelengths of electromagnetic radiation. The low emissivity coatings typically comprises a single or a stack of different coating layers, each coating layer is carefully selected based on their optical properties such that the low emissivity stack reflects and transmits specific parts of the visible and infrared spectrum. Low emissivity coatings may be deposited on the glass surface using a variety of different soft and hard coat deposition methods such as pyrolytic or sputtering methods.

In one or more embodiments, the seal material may be applied by a nozzle as described in any of the previous aspects of the present disclosure.

In one or more embodiments of the fifth aspect of the disclosure, the VIG unit is produced by any of the embodiments of the method according to the first aspect and/or third aspect of the disclosure and/or by the system according to the third aspect of the disclosure and/or by the use of a nozzle according to the second aspect of the disclosure. In one or more embodiments, the VIG unit comprises any of the features or benefits described in relation to a VIG unit of any of the previous aspects of the disclosure. In one or more embodiments, the VIG unit of any of the previous aspects of the disclosure may comprise any of the features and benefits described in relation to the fifth aspect of the disclosure.

In one or more embodiments, the VIG unit of any of the previous aspects of the present disclosure may comprise any of the features and/or benefits described in relation to the fifth aspect of the disclosure.

FIGURES

Aspects of the present disclosure will be described in the following with reference to the figures in which.

DETAILED DESCRIPTION

Figure 1A:
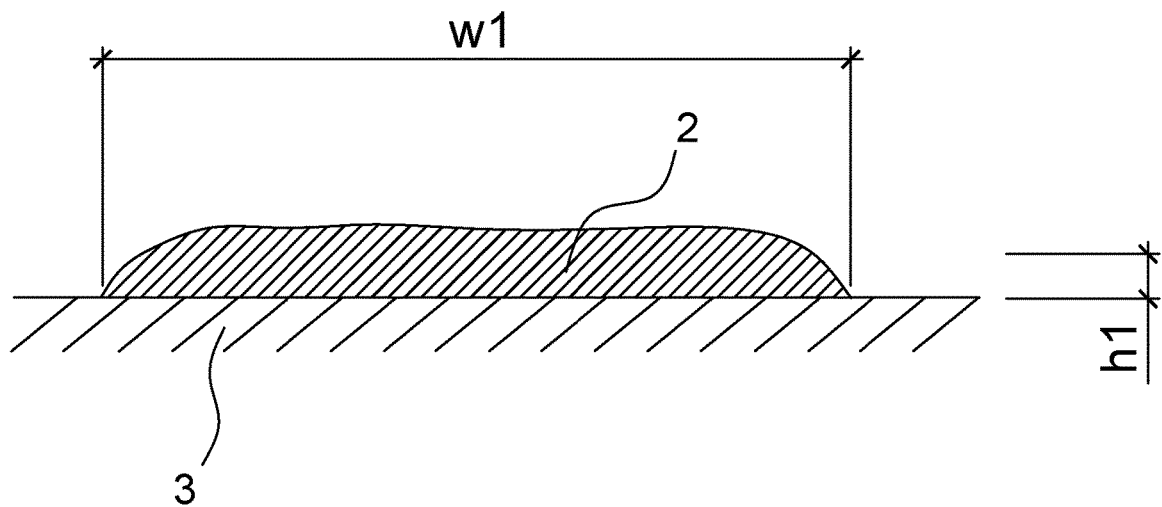
FIG. 1a shows a cross-sectional view of a seal material applied on a glass surface by means of an elongated nozzle.

FIG. 1a illustrates a cross-sectional view of a seal material 2 applied on a glass surface 3a of a glass sheet 3 by means of an elongated nozzle opening 6. Due to the elongated nozzle opening 6, the applied seal material 2 is of an elongated shape, having a width (w1) measured along the longest extent of the seal material 2, here along the glass surface and a height (h1) measured along a direction perpendicular to glass surface 3a. In one or more embodiments, the seal material 2 is of a consistency/viscosity making it extrudable through the nozzle opening 6 and in the present example, the seal material 2 is a premade paste of low melting point glass material containing binder and solvent.

Figure 1B:
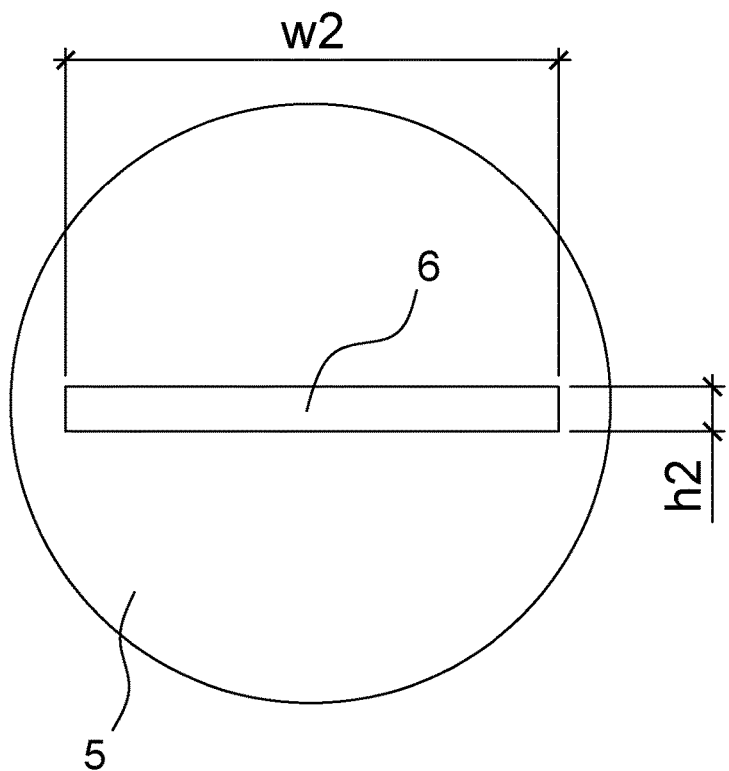
FIG. 1b shows a front view of a nozzle having an elongated nozzle opening.

FIG. 1b shows a front view of the nozzle 5 having a nozzle opening 6 and configured to apply a seal material 2 at the major surface 3a of the glass sheet 3 through a nozzle opening 6 for dispensing the seal material 2. The nozzle 5 is viewed a long a direction perpendicular to the extent of the nozzle opening 6. The nozzle opening 6 is of elongated shape being substantially a rectangular cross-sectional shape of a width (w2) measured along the longest extent of the opening 6 and a height (h2) measured along the shortest extend of the opening 6. In one or more examples, the width (w2) and the height (h2) are measured along a first and second direction being orientated perpendicular to each other. In one or more embodiments, the edge(s) of the nozzle opening is substantially smooth, so as to provide a smooth surface in contact with the seal material when dispensed.

In one or more examples, a tip part of the nozzle 5 may be a separate element to the remainder of the nozzle 5 and may be configured to be arranged onto conventional nozzle tips having round nozzle openings, so as to convert the nozzle 5 into having an elongated nozzle opening 6. The attachment of the front tip part may be aided by any suitable fastening means such as by a screw-connection, clamp, glue etc.

In one or more embodiments, the application of seal material 2 on a glass sheet surface 3a may be provided by two or more nozzles 5 each having an elongated nozzle opening 6 for e.g. faster application time and reduced VIG production time.

In one or more examples, at least the parts of the nozzle 5 in contact with the seal material 2, such as the interior of the nozzle 5, a nozzle tip part or the entire nozzle 5 may be made of metal, such as steel or it may be made of a plastic material, such as polyethylene or acetyl. For applications of a paste of low melting point glass material containing solvent, the nozzle 5 is preferably made of metal or other solvent stable materials.

In one or more examples, the side seal material 2 is a premade lead-less low melting point glass material, such as a low melting point glass material containing metal oxides, binder, solvents and $SiO_2$ glass particles, which is dispensed using a polyethylene nozzle 5 having an elongated and substantially rectangular nozzle opening 6 of a width of 8 mm and a nozzle opening height of 0.25 mm. The material may be dispensed using a pressure of 10-15 Psi and provided suitable dispensing flows and seal dimension consistency. For most low melting point glass materials in paste-form, a nozzle opening height equal or above 0.4 mm is preferably avoided as at these nozzle opening height(s) too much seal material is dispensed at pressures above 3 Psi. At a dispensing pressure of 2-3 Psi the low melting point glass material is instead dispensed through the nozzle in an inconsistent manner, unsuitable for the VIG unit application.

Figure 2A:
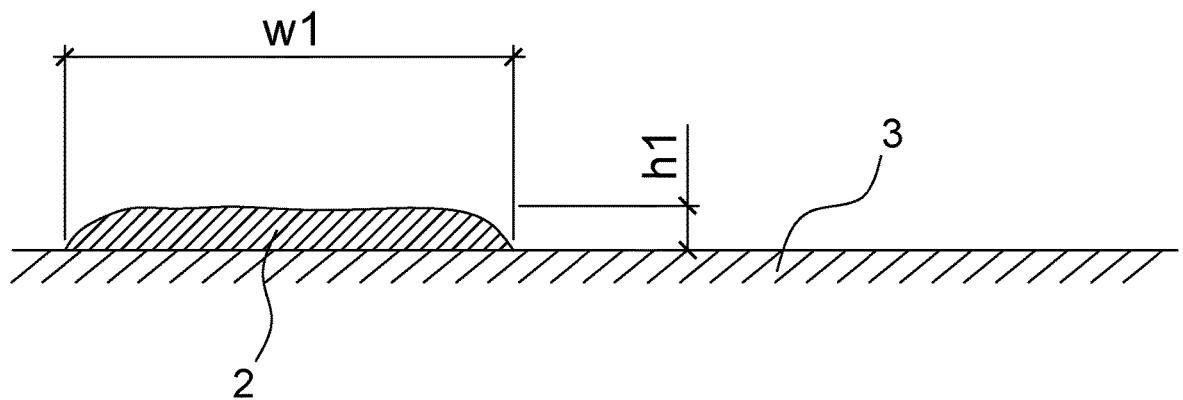
FIG. 2a shows a side view of a seal material on a glass sheet for a vacuum insulated glazing unit.

FIG. 2a shows a cross-sectional side view of a glass sheet with seal material 2 applied on the surface 3a thereof, by means of a nozzle having an elongated nozzle opening of a substantially rectangular cross-sectional shape similar to the rectangular shaped nozzle opening as shown in FIG. 1b. As seen in FIG. 2a, the cross section of the seal material is not identical to the shape of the nozzle opening, which can be due to factors such as the consistency of the seal material, wettability of the glass surface and application conditions etc. Especially, when the seal material is in liquid or liquid-paste form, the edges of the seal material can become slightly rounded when arranged on the glass sheet surface due to factors such as the force of gravity and surface tension of the seal material, and not necessarily due to the shape of the nozzle opening. By choosing seal materials of a more solid consistency than the present exemplary seal material, a larger correspondence between the shape of the nozzle opening and the applied seal material may be provided.

In general, a slight deviation of the side seal material shape from the shape of the nozzle opening shape is not critical for the present VIG unit application as the low melting point glass seal material will undergo heat treatment and also flattening during pairing and evacuation.

Figure 2B:
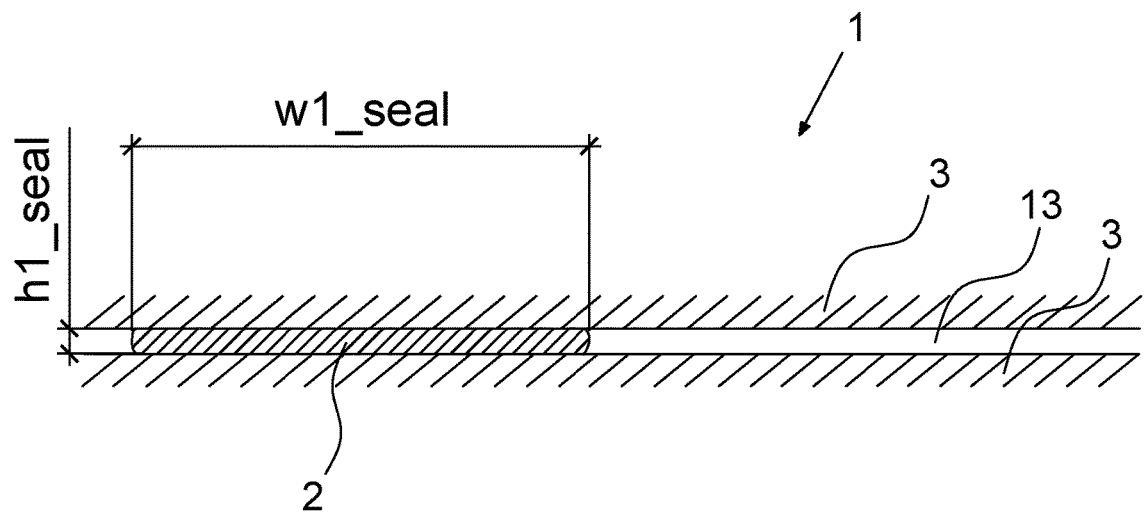
FIG. 2b shows a side view of a part of a vacuum insulated glazing (VIG) unit with a side seal.

FIG. 2b shows a side view of a vacuum insulated glazing (VIG) unit 1 having a hermetic side seal made using the glass sheet with applied seal material as shown in of FIG. 2a which has been paired with a second glass sheet, so as to create a gap in between the glass sheets. The gap is maintained by a support structure comprising a plurality of spacers 4 e.g. steel spacers. Prior to pairing the low melting point glass material is dried to evaporate any solvents in the material which decreases the volume of the seal material, thereafter the seal material undergoes heat treatment to create a hermetic seal and the interior space is evacuated and sealed to create the VIG unit, which evacuation may further push the glass sheets 3 together. Forcing the glass sheets together may also be assisted by one or more clamps.

In the present example, the side seal material is a low meting point glass material which creates a hermetic seal after heat treatment of the low melting point seal material. The heat treatment of the low melting point glass material 2, and in some embodiments simultaneously the entire VIG unit 1, may comprise a sequence of treatment steps making up a temperature profile. In one or more examples, in a first heating step, after evaporation of the solvent, the low melting point glass material 2 is heated to a first temperature (T1) of between 380 degrees C. and 400 degrees C. by heating means, e.g. a furnace. The second heating step may comprise maintaining said first temperature (T1) for a period long enough to create an efficient hermetic bond, such as between 20 min and 50 min. Thereafter, in the third heating step, the temperature provided by the heating means reduced such that the temperature of the seal material is lowered to a curing temperature (Tcure) for curing said low melting point glass material. The interior space 13 is evacuated during or after the second heating step and may be evacuated at a temperature of at least 275 degrees Celsius.

The VIG unit may be evacuated through an evacuation opening extending through one of the glass sheets 3, from the interior to the exterior glass sheet surfaces 3a. The opening may comprise an evacuation tube, which is sealed to the sides of the hole by means of a top sealing material, such as a low melting point glass frit material. The evacuation of the gap through the tube may be provided by a pump in connection with said tube and in fluid connection with said interior space of the gap. After evacuation of the space to a high vacuum level or below, the tube is seal so as to seal the space in the gap. The tube may be sealed by heating the tip of the tube, e.g. tube tip off method. Alternatively, the tube may be arranged through a portion of the side seal material in the VIG unit 1 and sealed by means of heating or by removing said tube and subsequently heating said top seal material to close the evacuation opening.

Due to VIG manufacturing steps to pairing and evacuation, which forces the sheets 3 together, the seal material height (h1) is reduced to a seal height (h1_seal) which is similar to the height of the gap. The seal material width (w1) may be slightly increased to a seal width (w1_seal) due to the displacement of seal material during pairing and evacuation of the VIG unit 1. But mainly the seal width (w1_seal) may be maintained at a width similar to the applied seal material width (w1) due to elongated shape of the applied seal material provided by the elongated nozzle opening, e.g. the variation in width may be less than 20%, such as less than 10% or such as less than 7% across a seal length of 10 cm. A control of the shape of the elongated nozzle opening may be therefore in turn control the shape of the final VIG unit side seal.

Figure 3A:
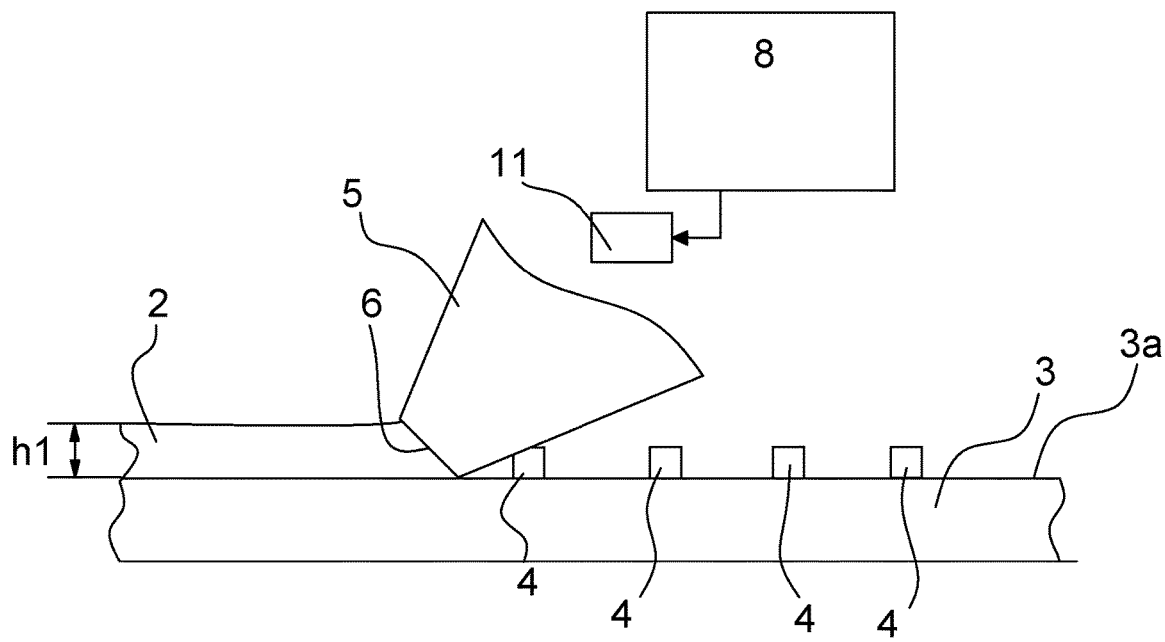
FIG. 3a shows a side view of a glass sheet with seal material being applied on the surface thereof by means of a nozzle.

FIG. 3a shows schematically a side view of a glass sheet 3 with seal material 2 applied on the glass sheet surface 3a by means of a nozzle 5 having an elongated nozzle opening 6. The seal material 2 is applied to a seal material height (h1). The nozzle 5 is comprised in an application system 7 for applying said seal material 2, which application system 7 further comprises a seal material storage container (not shown) in connection with said nozzle 5 and a pressure system 11 for forcing said seal material 2 out of the nozzle opening 6. A control system 8 for controlling the seal material application by means of the nozzle 5, e.g. such as pressure applied to the seal material, is also comprised in said application system 7. As can be seen, support structures 4 to be arranged in the evacuated gap of the final vacuum insulated glazing (VIG) unit 1 may be present at the major surface 3a of the glass sheet 3 during the applying of the seal material 2, but in further embodiments of the present disclosure, the support structures 4 may be placed later on in the VIG unit manufacturing process.

Figure 3B:
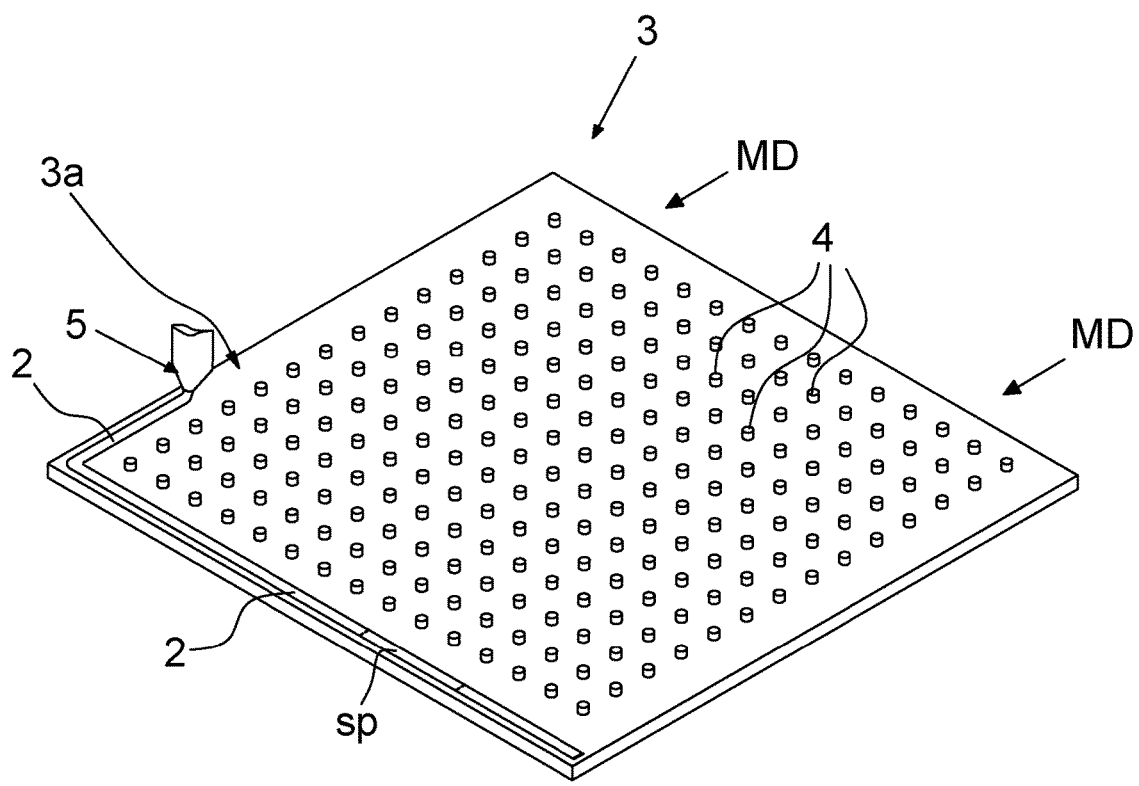
FIG. 3b shows a side view of a glass sheet with seal material being applied on the surface thereof while the glass sheet is displaced.

FIG. 3b schematically shows a perspective view of the glass sheet 3a of FIG. 3a. In one or more examples and as shown in the present example, the seal material 2 is arranged adjacent to the edge of the glass sheet surface 3a at a distance from the edge of the surface 3a, e.g. such as 3-5 mm from the edge measured along the surface 3a and along a direction substantially perpendicular to the edge. In one or more embodiments, the seal material 2 may be arranged abutting the edge of the glass sheet surface 3a.

The support structure 4 of the VIG unit 1 comprises a number of separate spacers 8 arranged at equal distances between them in the repeated pattern shown. In one or more embodiments, the distance between the spacers 8 may vary across the sheet surface 3a.

In one or more examples, the seal material 2 is applied in continuous ribbon of seal material 2 on the glass sheet surface 3a, by means of a nozzle having an elongated nozzle opening. In one or more embodiments, the seal material ribbon may be length-wise divided into one or more seal portions (sp). An exemplary seal portion of approximately 20 cm in length, measured along the longitudinal extent of the ribbon, is indicated in FIG. 3b. The seal ribbon, provided by an elongated nozzle opening, may be of a seal width variation less than 20% within said seal portion of the ribbon. The continuous ribbon may be provided by a relative movement between the glass sheet 3 and the nozzle 5. In the present example, the glass sheet is moved along a movement direction MD while the seal material is dispensed from the nozzle to the glass sheet surface 3a.

The glass sheet 3 may in one or more embodiments of the present disclosure be placed on a transport system 12 such as a conveyer belt, a plurality of rollers, a flat and rigid surface, for example combined with a scratch reducing/preventing material (not illustrated) such as a cushion or fabric arranged in between the glass sheet 3 and the transport system 12. For applying a ribbon of seal material 2 along the edge of the glass sheet 3a relative movement between the nozzle opening 6 and the glass sheet surface 3a is provided e.g. by moving the glass sheet 3 and keeping the nozzle 5 in a fixed position, or by moving the nozzle 5 while keeping the glass sheet 3 in a fixed position, and/or a combination thereof. The transport system 12 may further comprise one or more drive arrangements such as electric motors configured to provide the relative displacement between the nozzle(s) 5 and glass sheet 3. The drive arrangement may be configured to operate the transport system 12 and thus the glass sheet 3 placed on the transport system 12, so as to provide the relative displacement between the glass sheet surface 3a and the nozzle opening 6. In one or more examples, the transport system 12 may be comprised in said application system 7. Additionally, the transport system 12 may be controlled by said control system 8 (not shown), based on operator input or pre-selected control inputs to said control system 8.

In one or more embodiments, the seal material 2 is dispensed from the nozzle opening 6 to said glass sheet surface 3a. As the dispenser distance (d1) between the nozzle opening 6 and the glass surface 3a can have an impact on the applied seal material shape and therefore the distance may e.g. be kept constant during seal material application, so as to for example provide a consistent seal material shape. In one or more examples, where the seal material 2 is low melting point seal material, the impact of surface tension of the dispensed low melting point glass material on the applied shape is increased when the dispenser distance (d1) is increased. The surface tension of the seal material 2 can provide a decrease in the width and an increase in thickness of the applied seal material 2. Furthermore, increasingly inconsistent and sometimes wavy seal material width (w1) may also be produced by increasing the distance (d1).

In one or more examples, before application of the seal material 2, the operator may make a pre-selection of a suitable dispenser distance (d1) to be provided between the glass sheet surface 3a and the nozzle opening 6 during application. Thereafter, there may be no need to adjust the relative vertical position of the glass sheet 3 and/or nozzle 5, as long as the relative horizontal movement between the glass sheet 3 and the nozzle 5 during seal application is in a direction parallel to the glass sheet 3 on which the seal material 2 is to be applied. For glass sheets 3 comprising a substantially planer glass sheet surface 3a, this method of preselecting the dispenser distance (d1) is in particular applicable.

In one or more examples, the dispenser distance (d1) may be pre-selected from a range between 0.2-4 mm. In one or more embodiments of the present disclosure, the distance d1 to be kept constant between the nozzle opening 6 and the glass sheet surface 3a is between 0.2 mm and 4 mm, such as between 0.5 mm and 2.5 mm, e.g. between 0.5 mm to 1.6 mm.

For example, the distance (d1) may be below 3 mm, such as below 2 mm, such as below 1 mm. The dispenser distance (d1) measured along the shortest distance between the nozzle opening and the glass sheet surface directly below the nozzle opening.

In one or more embodiments, any suitable glass material may be used for the glass sheets, for example a soda lime silica glass or an alkali aluminosilicate glass. The glass sheets can have the same or different thickness, and the thickness can be 1 to 6 mm, such as 2 to 4 mm, or such as 2.5 to 3.5 mm. The glass sheets may be of the same or different dimensions, such as the same or different lengths and/or widths. The glass sheet major surfaces may be rectangular or quadratic in shape. The glass sheets are substantially transparent to visible light (i.e. at least about 50% transparent, or such as at least about 70% transparent, or such as at least about 80% transparent, and or such as at least about 90% transparent), although they may be tinted in some embodiments.

In one or more embodiments, the glass sheets 3 are tempered glass sheets, also known as toughened glass, e.g. produced from annealed glass by means of a thermal strengthening procedure, with the purpose of introducing the compressive stresses into the surface(s) of the glass sheet. Thermally tempered glass may be produced by means of a furnace in which an annealed glass sheet 3 is heated to a temperature of approximately 600-700° C., after which the glass sheet 3 is rapidly cooled. The cooling introduces the compressive stresses into the glass sheet surface(s) 3a.

In one or more examples, the VIG unit to be manufactured may comprise glass sheets having surfaces which depart from planarity, such as tempered glass sheets, which may comprise surface variations, which may be e.g. caused due to roller waves and/or global bending of the tempered, such as a thermally tempered, glass sheet 3. Thermally tempered glass sheet surfaces 3a may have significantly larger surface variations than e.g. annealed glass sheets. If the departure from planarity is substantial enough to alter parameters such as the seal efficiency of the seal material, the application system 7 may be utilized for ensured constant dispenser distance (d1) during seal material application.

Figure 4A:
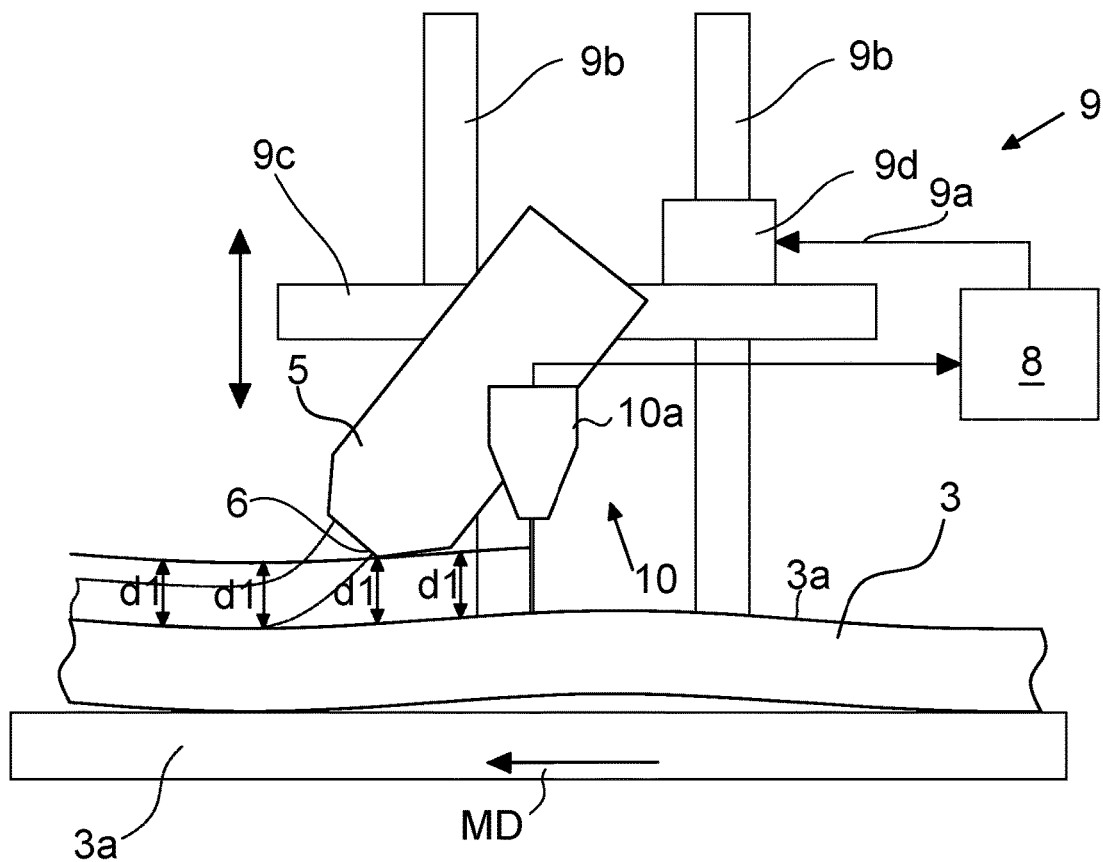
FIG. 4a shows a side view of a system for adjusting the dispenser distance (d1) while seal material is applied on a glass sheet surface.

In one or more embodiments, the application system 7 may be configured to adjust the relative vertical position of the nozzle opening 6 and the glass sheet surface 3a, based on a pre-selection of a suitable dispenser distance(s) (d1) to be provided between the glass sheet surface 3a and the nozzle opening 6 during application. FIG. 4a discloses schematically an application system 7 for applying a seal material 2 on a glass sheet surface 3a of a tempered glass sheet 3 for a vacuum insulated glass VIG unit. The application system 7 comprises an adjustment system 9, a control system 8 and a sensor system 10 comprising one or more distance sensors 4a, configured to be used to obtain surface variation data of the major surface 3a of the glass sheet 3 to be applied with the seal material 2.

Additionally, the application system 7 comprises a nozzle 5 according to embodiments of the present disclosure having an elongated nozzle opening 6 for dispensing the seal material 2. The control system 8 of the application system 7 may be configured to receive a measurement input 4b based on a measurement signal from the sensor 10a of the sensor system 10. The control system 8 comprises a data processor 7a configured to process the measurement signal to establish surface variation data representing the surface variation of the surface 3a of the tempered glass sheet 3.

As the glass sheet 3 is moved, by means of the transport system 12 as previously described, in a movement direction MD relative to the sensor 10a, the distance between the distance sensor 10a may change according to the surface variation of the glass sheet 3, especially if such glass sheet is a thermally tempered glass sheet as illustrated in the present example. This is registered by the sensor 10a and a measurement signal 4b, e.g. an analogue signal such as a voltage or current, or a digital measurement signal is provided to the control system 8. In one or more example, said sensor system 10 obtains the surface variation data by the sensor 10a during the relative displacement between the sensor 10a of the sensor system 10 and the tempered glass sheet 3 surface 3a.

In one or more examples, the sensor or sensors 10a of the sensor system 10 may in one or more embodiments of the present disclosure comprise an electromagnetic measurement arrangement, e.g. be based on a detection of scattered and/or reflected electromagnetic waves from the surface, such as an optical measurement arrangement. In one or more embodiments of the present disclosure, the sensor system 10 may comprise one or more optical sensors, such as image sensors, for example one or more charge-coupled devices (CCD) sensors. Alternatively or additionally, the sensor 10a may comprise of a physical measurement arrangement comprising one or more stylus devices, arranged in direct contact with the glass surface 3a and moved across the surface 3a such as to register any physical height variations across in order to generate a surface profile.

The data processor 7a processes this measurement signal 4b according to a regulation program code stored in a data storage 7b, and based thereon, one or more applying parameters configured to control the applying of the seal material 2 by the nozzle 5 is/are adjusted. In one or more embodiments, of the present disclosure, the control system 8 may comprise a closed loop control and/or open loop systems of the one or more applying parameters. The control system 8 accordingly comprises one or more data storages 7b, one or more data processors, such as one or more micro processors, and related control circuitry, data input and data output modules/systems and/or the like configured to provide an adjustment of the applying parameter(s).

In one or more embodiments, an adjustment of the one or more applying parameters may provide a control of the dispenser distance (d1) defined between the nozzle opening 6 and the glass sheet surface 3a by means of an adjustment system 9 for controlling the dispenser distance (d1). The adjustment system 9 may be configured to control the dispenser distance (d1) based on a control signal 9a from the control system 8.

As shown in FIG. 4a, the adjustment system 9 may be controlled by the control system 8 based on the sensor input from sensor 10a, so as to maintain a substantially constant, predefined distance (d1) between the nozzle opening 6 and the glass sheet surface 3a.

The adjustment system 9 thus comprises a distance adjustment system 9 comprising one or more fixed frame parts 9b and one or more displaceable mountings 9c arranged to be displaced relative to the fixed frame part(s) 9b. The fixed frame part(s) 9b may e.g. comprise one or more rods or rail parts, a mounting configured to provide a rotational movement and/or the like. The nozzle 5 is fixed to the displaceable mounting 9c such as a bushing, a rail connector or the like. One or more displacing devices 9d, such as one or more motors, e.g. a servo motor or a stepper motor, a piezoelectric motor arrangement, a linear actuator or the like is connected to the fixed frame part(s) 9b and the displaceable mounting 9c.

The one or more displacing devices 9d displace the mounting(s) 9c and thus the nozzle 5 while it is guided by the fixed frame part(s) 9b, so as to control the distance between the nozzle opening 6 and the glass sheet surface 3b based on the input 9a, which has been generated by the control system 8 based on the input 4b from the sensor system 10.

The displacing device/displacer 9d adjusts the displacer distance d1 based on the input 9a from the control system 8, so that the nozzle/dispenser outlet 6 will follow a displacing adjustment trail/path (dashed line 13) calculated/estimated by the control system 8 based on the input 4b from the sensor system 10, and hence, the distance d1 will be kept substantially constant as the control system 8 adjusts the adjustment system 9 so that the distance d1 is adapted to the surface variations of the tempered glass sheet 3.

In one or more embodiments of the present disclosure, the dispenser distance (d1) to be kept constant between the nozzle opening 6 and the glass sheet surface 3a can be between 0.2 mm and 4 mm, such as between 0.5 mm and 2.5 mm, e.g. between 0.5 mm to 1.6 mm. For example, the distance d1 may be below 3 mm, such as below 2 mm, such as below 1 mm.

The adjustment system 9 may be configured to control the dispenser distance d1 within an adjustment range AR, towards and away from the glass surface 3a in this range AR, see e.g. description above. The distance adjustment range AR may e.g. be at least 0.2 mm, such as at least 0.3 mm, e.g. at least 0.4 mm, or even larger such as at least 1 mm, e.g. at least 2 mm. In one or more embodiments of the present disclosure, the adjustment range may be between 0.1 mm to 20 mm, e.g. in the range of 0.1 mm to 10 mm, such as in the range of 0.15 to 2 or 5 mm so as to control the dispenser distance d1 during a relative movement between the nozzle 5 and the tempered glass sheet 3, and possibly also for different glass sheet thicknesses.

In one or more embodiments of the present disclosure, the adjustment system 9 for providing the dispenser distance (d1) control, may be configured to provide an adjustment with an adjustment resolution within the distance adjustment range AR, which is defined as $$\text{Adjustment resolution} = \frac{\text{adjustment range}}{\text{resolution}}$$

The adjustment resolution may be above 0.1 mm, such as above 0.05 mm, e.g. above 0.01 mm. The adjustment resolution of the adjustment system 9 may in one or more embodiments of the present disclosure be between 0.001 mm and 0.1 mm, such as between 0.05 mm and 0.08 mm.

For example for an adjustment resolution of 0.05 mm within the range AR provides that the minimum distance (d1) adjustment the adjustment system 9 can provide is 0.05 mm, so that if the control system 8 sends a signal to the displacing device 9d to provide an adjustment, the adjustment system 9 will at least provide a 0.05 mm adjustment, and the adjustment may e.g. be provided by a 0.05 mm increment/decrement at a time. This adjustment resolution may e.g. be analogue or digitally controlled. For example, an Analog to Digital (A/D) converter of the control system 8 may be used, having a predefined bit resolution.

This may naturally be adapted in different ways dependent on the transport system 9 comprising e.g. displacing device 9d in the form of a motor such as a stepper motor and e.g. also a gearing arranged to displace the nozzle 5. For example, stepper/step motor displacement configurations capable of providing a target resolution of 1 micrometer or even a larger resolution are available, which should be more than sufficient, and a lower resolution may also be suitable for controlling the dispenser distance (d1).

In one or more embodiments, the sensor system 10 obtains the surface variation data while the seal material 2 is applied by the nozzles 5, and thus, the sensor(s) 4a may e.g. be arranged ahead of the nozzle as illustrated in FIG. 2, or at/near the nozzle 5 outlet 6 (see FIG. 3) to detect the surface variation of the surface 3a so that the control system 8 can adjust the distance d1 and/or other applying parameters accordingly correspondingly based on the input from the sensor(s) 4a.

Figure 4B:
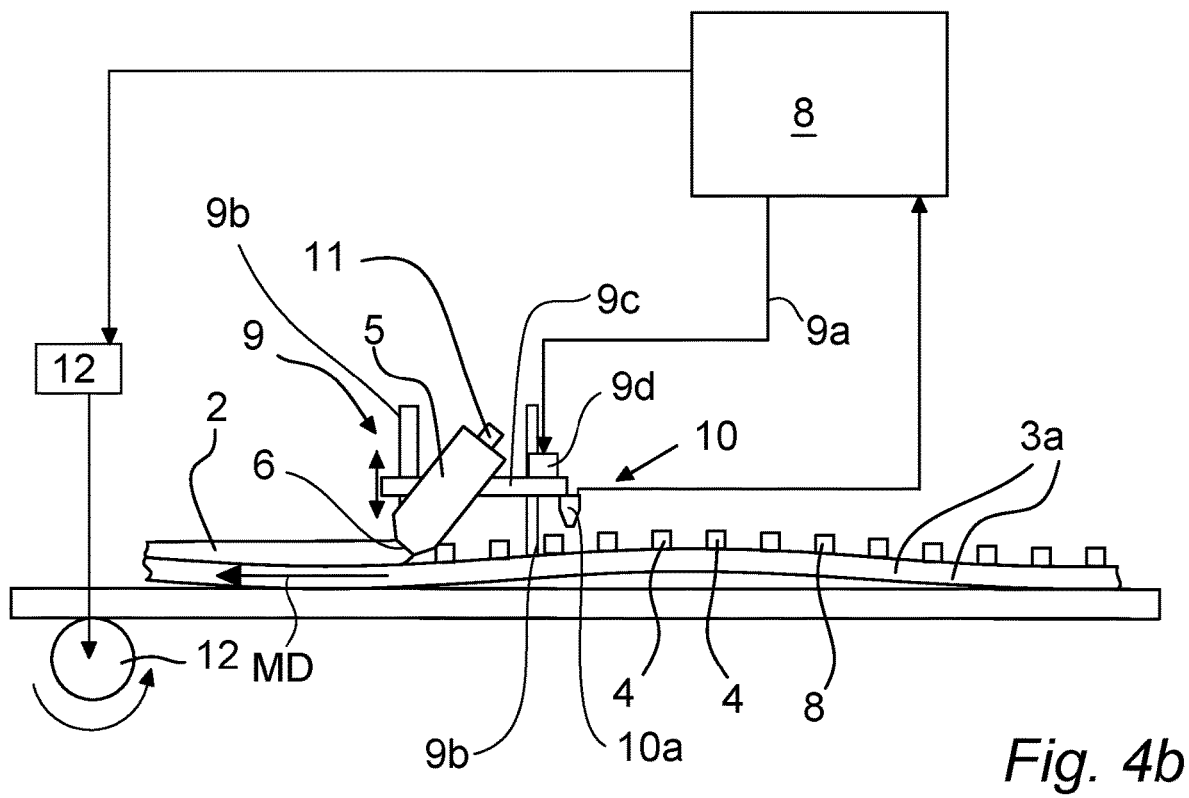
FIG. 4b shows a perspective view of a system for adjusting the dispenser distance (d1) during application of seal material on the glass sheet surface.

FIG. 4b shows a schematic zoomed-out view of the setup with the application system 7 and a glass sheet 3 of FIG. 4a, where the adjustment system 9 is to be regulated by the control system 8 based on input 4b from the sensor system 10.

The glass sheet 3 is placed on a transport system 12 which in the present example comprises rigid surface on a plurality of rollers. For applying a ribbon of seal material 2 along the edge of the glass sheet 3a relative movement between the nozzle opening 6 and the glass sheet surface 3a is provided by moving the glass sheet 3. The transport system 12 may further comprise one or more drive arrangements such as electric motors configured to provide the relative displacement between the nozzle(s) 5 and glass sheet 3. In the present example the transport system 12 is controlled by said control system 8 of the application system 7, based on operator input or pre-selected inputs to said control system 8. The inputs may relate to the speed of relative movement of the direction of movement.

As can be seen in FIGS. 3a, 3b, 4a and 4b, the opening/outlet of the nozzle may in embodiments of the present disclosure be placed above, such as directly above the major surface 3a of the glass sheet 3 onto which the side seal material is provided.

The nozzle may be arranged at an angle between 10 degrees to 90, such as between 20 degrees to 75 degrees to the major surface 3a of the glass sheet while the material is applied. This angle may be measured/estimated between the major surface 3a and an axis, such as a centre axis of the nozzle extending in the longitudinal direction and/or seal material applying direction of the nozzle.

After the side seal material is provided to one or both major surfaces of the glass sheets for the VIG unit, the glass sheets are paired (with distributed support structures between the glass sheet to maintain the gap to be evacuated after it is evacuated), and the major surface or surfaces comprising the applied side seal material are configured to face the gap to be evacuated, so that the side seal is placed between the major surfaces of the glass sheets. This is not illustrated in the drawings.

Example 1

A nozzle opening of a width (w2) of 8 mm and a height (h2) of 0.25 mm was used to apply a seal material on an annealed glass sheet at three different dispenser distances (d1): 1.0 mm, 1.5 mm and 2.0 mm. The seal material was a low melting point glass material comprising $SiO_2$, metal oxides, binder and solvent.

At 1.0 mm dispenser distance the width of the applied seal material resembled the width (w2) of the nozzle opening, as it was of an average width (w1) of 8.1 mm. The height (h1) of the seal material varied along the width and averaged on 0.68 mm+/−0.15 mm.

At 1.5 mm dispenser distance the dimensions of the applied seal material was different to the dimensions of the nozzle opening. The average width (w1) of the applied seal material was 6.3 mm, being 1.7 mm smaller than the nozzle opening width (w2) as a result of surface tension of the paste. The height (h1) of the seal material varied along the width, though to a much less extent than the previous example, and averaged on 0.67 mm+/−0.04 mm.

At 2.0 mm dispenser distance, the dimensions of the applied seal material was also different to the dimensions of the nozzle opening, but very similar to the applied seal dimensions provided at dispenser distance (d1) of 1.5 mm. The average width (w1) of the applied seal material was 6.6 mm, being 1.4 mm smaller than the nozzle opening width (w2) as a result of surface tension of the paste. The height (h1) of the seal material varied along the width, to a similar extent as in the previous example, and averaged on 0.71 mm+/−0.05 mm.

The average seal material height was shown to vary by less than 22%, less than 6% and less than 7% along ¾ of the seal material width for seal material application at dispenser distance (d1) of 1.0, 1.5 and 2.0 mm respectively, where the ¾ part of the width is centred around the centre point half way through the total width of the seal material. In all seal material applications, using an elongated nozzle opening, the difference in height (h1) was less than 0.3 mm.

The test shows indications of a significant dimensional change in applied seal material occurring when changing the dispenser distance (d1) from 1 mm to 1.5 mm, while only small dimensional change occurs when changing the dispenser distance (d1) from 1.5 mm to 2.0 mm. In application where the seal material dimensions, especially the width (w1) is to resembled the nozzle opening width, a dispenser distance (d1) of around 1 mm or below is desired. The results further indicate that in applications where a more consistent seal material height (h1) is desired a dispenser distance (d1) of above 1.5 mm can be beneficially chosen.

Example 2

A comparable study of different seal material application was undertaken to reveal possible differences in side seal strength. A seal material application using a round nozzle and a seal material application using an elongated nozzle was studied. For each application type, nine units was prepared, where each unit comprises two glass sheets connected around ¾ of the perimeter by means of the seal material being a Te (Tellurium) Va (Vanadium) solder glass material. The same seal material was used in both applications. The diameter of the round nozzle opening was 1.6 mm and the height of the flat nozzle opening was 0.25 mm while the width was 8 mm. The nine units were divided into three sets of three units in each, all prepared using the same seal material application. A first set prepared using the round nozzle and a first set prepared using an elongated nozzle were heat treated at a first temperature of 400 degrees Celsius for 20 min. A second set prepared using the round nozzle and a second set prepared using the elongated nozzle were heated at a temperature of 400 degrees Celsius for 5 min. A third set prepared using the round nozzle and a third set prepared using the elongated nozzle were heated at a temperature of 385 degrees Celsius for 20 min.

A wedge test setup was used and the units were measured for force breakage. The units were placed between springs of a clamp system and in an upright position with a side of the unit being free of seal material facing upwards towards the testing element arranged to apply a downward force on one of the glass sheets of the unit, ranging from 0 to 200 Lbs of force in the present example. A strain rate of 0.05 inches/minute was applied and the load (Lbs) at breakage point for the unit was measured for each unit.

Results showed that for the first set having seal material applied by an elongated nozzle, the first unit broke at a load of 87 Lb, the second unit broke at a load of 103 Lb and the third unit broke at a load of 183 Lb, giving an average breakage load of 124 Lb+/−51 Lb. For comparison, the results showed that for the first set having seal material applied by a round nozzle, the first unit broke at a load of 72 Lb, the second unit broke at a load of 121 Lb and the third unit broke at a load of 77 Lb, giving an average breaking load of 90 Lb+/−27 Lb. The results showed that for the first sets heated at 400 degrees Celsius for 20 min, the side seal material application using the elongated nozzle provided a larger side seal strength than the side seal material application using the round nozzle. By comparison, of the average load breakage points, the average breakage load for the elongated seal material application was 38% higher than the average breakage load for the round seal material application.

The results further showed that for the second set having seal material applied by an elongated nozzle, the first unit broke at a load of 95 Lb, the second unit broke at a load of 88 Lb and the third unit broke at a load of 98 Lb, giving an average breakage load of 94 Lb+/−5 Lb. For comparison, the results showed that for the second set having seal material applied by a round nozzle, the first unit broke at a load of 83 Lb, the second unit broke at a load of 52 Lb and the third unit broke during sample preparation, giving an average breaking load of 68 Lb+/−22 Lb. The results showed that for the second sets heated at 400 degrees Celsius for 5 min, the side seal material application using the elongated nozzle provided a larger side seal strength than the side seal material application using the round nozzle. By comparison, of the average load breakage points, the average breakage load for the elongated seal material application was 38% higher than the average breakage load for the round seal material application.

For the third set having seal material applied by an elongated nozzle, the results showed that the first unit broke at a load of 95 Lb, the second unit broke at a load of 98 Lb and the third unit broke at a load of 144 Lb, giving an average breakage load of 112 Lb+/−27 Lb. For comparison, the results showed that for the third set having seal material applied by a round nozzle, the first unit broke at a load of 88 Lb, the second unit broke at a load of 47 Lb and the third unit broke at load of 101 Lb, giving an average breaking load of 79 Lb+/−28 Lb. The results showed that for the second sets heated at 385 degrees Celsius for 20 min, the side seal material application using the elongated nozzle provided a larger side seal strength than the side seal material application using the round nozzle. By comparison, of the average load breakage points, the average breakage load for the elongated seal material application was 42% higher than the average breakage load for the round seal material application.

Overall, the experiments showed clear indications of improvements in bond strength of the seals when using an elongated nozzle opening for seal material application instead of a round nozzle opening.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

REFERENCES

1 Vacuum insulated glass (VIG) unit
2 Seal material
3 Glass sheet
3a Major glass sheet surface of a glass sheet,
4 Support structure
5 Nozzle
6 Nozzle opening
7 Application system for seal material application
8 8 Control system
9 Adjustment system for controlling the dispenser distance
10 Sensor system
10a Sensor of sensor system
11 Pressure system
12 Transport system for supporting glass sheet
13 Interior space in gap
h1 Height of seal material
w1 Width of seal material
h1_seal Height of side seal
w1_seal Width of side seal
h2 Height of nozzle opening
w2 Width of nozzle opening
d1 Dispenser distance defined between nozzle opening and glass sheet surface
sp Seal portion
T1 First temperature
Tcure Curing temperature
MD Movement direction

The invention claimed is:

1. A method of applying a seal material in manufacturing a vacuum insulated glazing (VIG) unit, wherein the VIG unit comprises:
    a first glass sheet, having a first interior major surface and a first exterior major surface,
    a second glass sheet having a second interior major surface and second exterior major surface, the glass sheets are placed in parallel with said interior major surfaces facing each other and providing a gap therein between, wherein a plurality of support structures are distributed in said gap, and
    a seal material for providing a seal of said gap,
wherein the method comprises the steps of:
    providing one of said glass sheets,
    arranging said seal material on a major surface of at least one of said glass sheets by means of a nozzle having a nozzle opening of elongated shape,
    wherein a width of the nozzle opening is between 3-15 mm measured along a major axis of the nozzle opening, and wherein the seal material when applied has a width of between 3-12 mm measured along the major surface of the glass sheet on which the seal material is deposited, and wherein the seal material width is between 0.7-1.3 times the nozzle width;
    providing the plurality of support structures on the major surface of at least one of the glass sheets;
    pairing said first glass sheet and said second glass sheet so that the surface of the at least one of said glass sheets comprising the seal material is the interior surface, and evacuating said gap so as to provide said VIG unit.

2. A method according to claim 1, wherein the arranged seal material is of an elongated transverse cross-sectional shape.

3. A method according to claim 1, wherein the major axis of the nozzle opening is substantially parallel to a major surface of the glass sheet.

4. A method according to claim 1, wherein the height of the nozzle opening, measured along the minor axis of the nozzle opening, is between 0.1-1.5 mm.

5. A method according to claim 1, wherein the nozzle opening is of a height between 0.10-0.40 mm and wherein the nozzle opening is of an aspect ratio between (16:1)-(48:1).

6. A method according to claim 1, wherein the applied seal material height (h1) is between 0.3-0.6 mm measured perpendicular to a major surface of the glass sheet on which the seal material is applied.

7. A method according to claim 2, wherein the transverse cross-sectional shape of the applied seal material is of a height between 0.4-0.6 mm and wherein the transverse cross-sectional shape is of an aspect ratio, being the ratio of width to height, is between (5:1)-(30:1).

8. A method according to claim 1, wherein the width of the nozzle opening is between 3-15 mm measured along the major axis of the nozzle opening.

9. A method according to claim 1, wherein the applied seal material width is between 3-12 mm measured along a major surface of the glass sheet on which the seal material is deposited.

10. A method according to claim 1, wherein the nozzle opening is arranged at a dispenser distance between 0.4-3 mm from said major surface when arranging said seal material on said major surface.

11. A method according to claim 1, wherein the method comprises the steps of
- obtaining by means of a sensor system surface variation data of the glass sheet surface to be applied with said seal material, and
- adjusting a dispenser distance defined between said nozzle opening and said glass sheet surface based on said surface variation data by controlling an adjustment system.

12. A method according to claim 1, wherein the seal material is a low melting point glass frit material.

13. A method according to claim 1, wherein one or more of the glass sheets is a tempered glass sheet.

14. A method according to claim 1, wherein the nozzle is positioned directly above and opposite to the major surface of said glass sheet to which the seal material is applied.

15. A method according to claim 1, wherein the seal material is applied to the major surface of said glass sheet directly from above.

16. A method according to claim 15, wherein the seal material is applied to the major surface of said glass sheet directly from above at an angle between 10 degrees to 90 degrees to the major surface.

17. A method according to claim 1, wherein the seal material is arranged on the major surface of said glass sheet by means of a nozzle before pairing said first glass sheet and said second glass sheet.

18. A nozzle configured for applying a seal material on a glass sheet for a vacuum insulated glazing unit prior to pairing the glass sheet with a second glass sheet, according to the method of claim 1, wherein the nozzle comprises a nozzle opening of elongated shape.

19. A method of manufacturing a vacuum insulated glazing (VIG) unit, wherein the method comprises applying a seal material in manufacturing a vacuum insulated glazing (VIG) unit according to claim 1.

* * * * *